(12) United States Patent
Nickoson (10) Patent No.: US 6,652,198 B2
(45) Date of Patent: Nov. 25, 2003

(54) AIR VALVE

(75) Inventor: Kieran P. Nickoson, Cleves, OH (US)

(73) Assignee: Security Systems Equipment Corp., Cincinnati, OH (US)

( * ) Notice: Subject to any disclaimer, the term of this patent is extended or adjusted under 35 U.S.C. 154(b) by 0 days.

(21) Appl. No.: 10/163,779

(22) Filed: Jun. 6, 2002

(65) Prior Publication Data

US 2002/0187011 A1 Dec. 12, 2002

Related U.S. Application Data

(60) Provisional application No. 60/296,216, filed on Jun. 6, 2001.

(51) Int. Cl.7 .............................................. B65G 51/34
(52) U.S. Cl. ........................ 406/13; 406/112; 406/147
(58) Field of Search .......................... 406/13, 110, 111, 406/112, 147, 148, 149

(56) References Cited

U.S. PATENT DOCUMENTS

| 1,385,727 A | 7/1921 | Stoetzel |
| 1,672,681 A | 6/1928 | Hamilton |
| 3,053,475 A | 9/1962 | Tonne |
| 3,237,881 A | * 3/1966 | Grosswiller, Jr. et al. ..... 406/19 |
| 3,306,555 A | 2/1967 | Tonne |
| 3,659,809 A | 5/1972 | Cook ........................... 243/19 |
| 4,189,261 A | 2/1980 | Kelley et al. ................ 406/112 |
| 4,436,456 A | 3/1984 | Thomas ......................... 406/19 |
| 4,512,688 A | 4/1985 | Hochradel ................... 406/111 |
| 4,984,939 A | 1/1991 | Foreman et al. ............... 406/84 |
| 5,147,154 A | 9/1992 | Scott ........................... 406/112 |
| 5,174,689 A | 12/1992 | Kondolf, Jr. ................. 406/112 |
| 5,304,017 A | 4/1994 | Vogel et al. ................. 406/111 |
| 5,562,367 A | * 10/1996 | Scott ............................ 406/13 |
| 5,564,868 A | 10/1996 | Vogel et al. ................. 406/112 |
| 5,584,613 A | 12/1996 | Greene et al. ................ 406/19 |
| 5,735,644 A | 4/1998 | Grosswiller et al. ........ 406/112 |
| 6,039,510 A | 3/2000 | Greene et al. ................ 406/21 |

* cited by examiner

*Primary Examiner*—Joseph A. Dillon
(74) *Attorney, Agent, or Firm*—Frost Brown Todd LLC (57) ABSTRACT

A blower assembly for a pneumatic tube system sequences start of two pneumatic sources, such as blowers, to pneumatically position passive closure devices, such as spools, that shift the blower assembly between pressure and vacuum modes. Thereafter, both blowers are cooperatively operated. Use of two blowers whose combined output achieves the desired pneumatic performance avoids the increased cost of having one or more blowers that only operate only for one mode of either pressure or vacuum. The passive closure devices reliably and rapidly position to enhance performance, especially as compared to electrically actuated closure devices.

5 Claims, 8 Drawing Sheets

AIR VALVE

CROSS REFERENCE TO RELATED APPLICATIONS

This application claims the benefit of, and hereby incorporates by reference in its entirety, the commonly owned U.S. Provisional Application Serial No. 60/296,216 that was filed on Jun. 6, 2001 by Kieran P. Nickoson: entitled: "AIR VALVE."

FIELD OF THE INVENTION

The present invention relates to a pressure regulation apparatus ideally suited for controlling transportation of materials in either of at least two directions, and more particularly to a bi-directional (pressure-vacuum) single tube pneumatic system.

BACKGROUND OF THE INVENTION

Pneumatic tube systems are well known for transporting capsules or carriers to one of several locations and back by selectively using pressure or vacuum to propel the carrier through a tube. Thereby, transactions requiring paper documentation may be conducted across barriers erected for security or across distances between parties.

Single tube installations are generally preferred as being simpler to install and use. Carriers are selectively transported in either direction within the single tube. To this end, blower assemblies are incorporated into a main station of the pneumatic tube system for selectively generating the pressure or vacuum. Much development has been performed in making blower assemblies that rapidly transfer the carrier yet slow the carrier at each station.

A challenge for known blower assemblies is to rapidly switch between pressure and vacuum modes in an economical and reliable manner. One technique is to provide two separately assigned blowers, either at opposite ends of the pneumatic tube system or within a blower assembly. Each blower is configured to propel a carrier in a direction opposite to the other. One blower assembly is unused during each operation, either from main station to remote station or remote to main station. Thus, such known separately assigned blower assemblies suffer from an undesirable requirement for having two large blowers with half of the pneumatic power unused.

In an attempt to overcome the advantages of separately assigned blowers, it is also known to have an electrically actuated air valve to selectively couple the intake or the exhaust of a single blower to the pneumatic tube system. Thereby, the full pneumatic power available is used during each operation. However, in addressing the excess pneumatic power disadvantage, such actuated blower assemblies introduce problems associated with the electrically actuated air valve. Specifically, the electrically actuated air valve reduces the overall reliability of the blower assembly by adding an component that can fail or that requires additional periodic servicing.

In addition, although reducing the per unit cost of the blower assembly by eliminating a second blower, the economic cost of using the pneumatic tube system is increased by the electrically actuated air valve. This increased economic cost is due to the delay in switching by the electrically actuated air valve as compared to separately assigned blower assemblies. The additional time in seconds for each customer transaction means that the pneumatic tube assembly can perform fewer customer transactions over a period of time. Thus, additional pneumatic tube assemblies have to be installed for additional capacity or customer-waiting time has to be increased.

Thus, a significant need exists for a blower assembly for a pneumatic tube system that rapidly switches between pressure and vacuum modes, yet does not leave half of the blower capacity unused during each operation.

BRIEF SUMMARY OF THE INVENTION

The invention overcomes the above-noted and other deficiencies of the prior art by providing an apparatus and method for providing selectively switched pressure and vacuum to a pneumatic tube system that uses at least two pneumatic sources to cooperatively provide the required amount of pressure or vacuum during each operation. In particular, passive air valves, such as air spools, are positioned by sequencing the order in which the two pneumatic sources are activated to switch between pressure and vacuum. The passively switched air valves tend to be low cost, reliable, and rapidly positioned.

As an additional benefit, commercially available blowers tend to have a purchase price that is disproportionate to their pneumatic power capacity. In particular, it tends to be more economical to generate the same amount of pneumatic power with two smaller blowers than with one larger blower. Consequently, the approach of sequencing two smaller blowers that cooperate in achieving the desired pneumatic power capacity has an additional advantage over separately assigned blower assemblies.

In one aspect of the invention, a method is described for selectively providing pneumatic pressure and vacuum to a system manifold with an air shifter that communicates between an atmosphere port and the system manifold. For a selected one of pneumatic pressure and vacuum, the air shifter is pneumatically positioned by activating a first pneumatic source first. After a delay for the pneumatically positioning of the air shifter, a second pneumatic source is started to increase the selected one of pneumatic pressure and vacuum to the system manifold. Thereby, a reliable and rapid switching of the mode of the blower assembly is accomplished by pneumatically positioned elements.

In another aspect of the invention, a blower assembly is described for a pneumatic tube system that uses pneumatic pressure and vacuum to propel a carrier through a pneumatic carrier tube. The blower assembly shifts pressure or vacuum between a system manifold, which communicates with the pneumatic tube system, and an atmosphere port. The blower assembly accomplishes this shifting by including an intake passage and an exhaust passage that both communicate between the system manifold and the atmosphere port. The blower assembly includes two pneumatic sources that intake air from the intake passage and expel air into the exhaust passage. An intake closure device in the intake passage and an exhaust closure device in the exhaust passage are positioned to pressure mode when the one of the pneumatic sources is activated first and are positioned to vacuum mode when the other pneumatic source is activated first.

In yet a further aspect of the invention, a pneumatic tube system employs a blower assembly that includes an air shifter that pneumatically responds to a first blower being started before a second blower to provide pressure to a pneumatic carrier tube. The blower assembly further responds to the second blower being started before the first blower to provide vacuum to the pneumatic carrier tube. Thereby, all of the blower capacity is used for both providing pressure or vacuum to the pneumatic carrier tube, avoiding the uneconomical cost of dedicating one or more blowers to each mode of operation.

These and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

Figure 1:
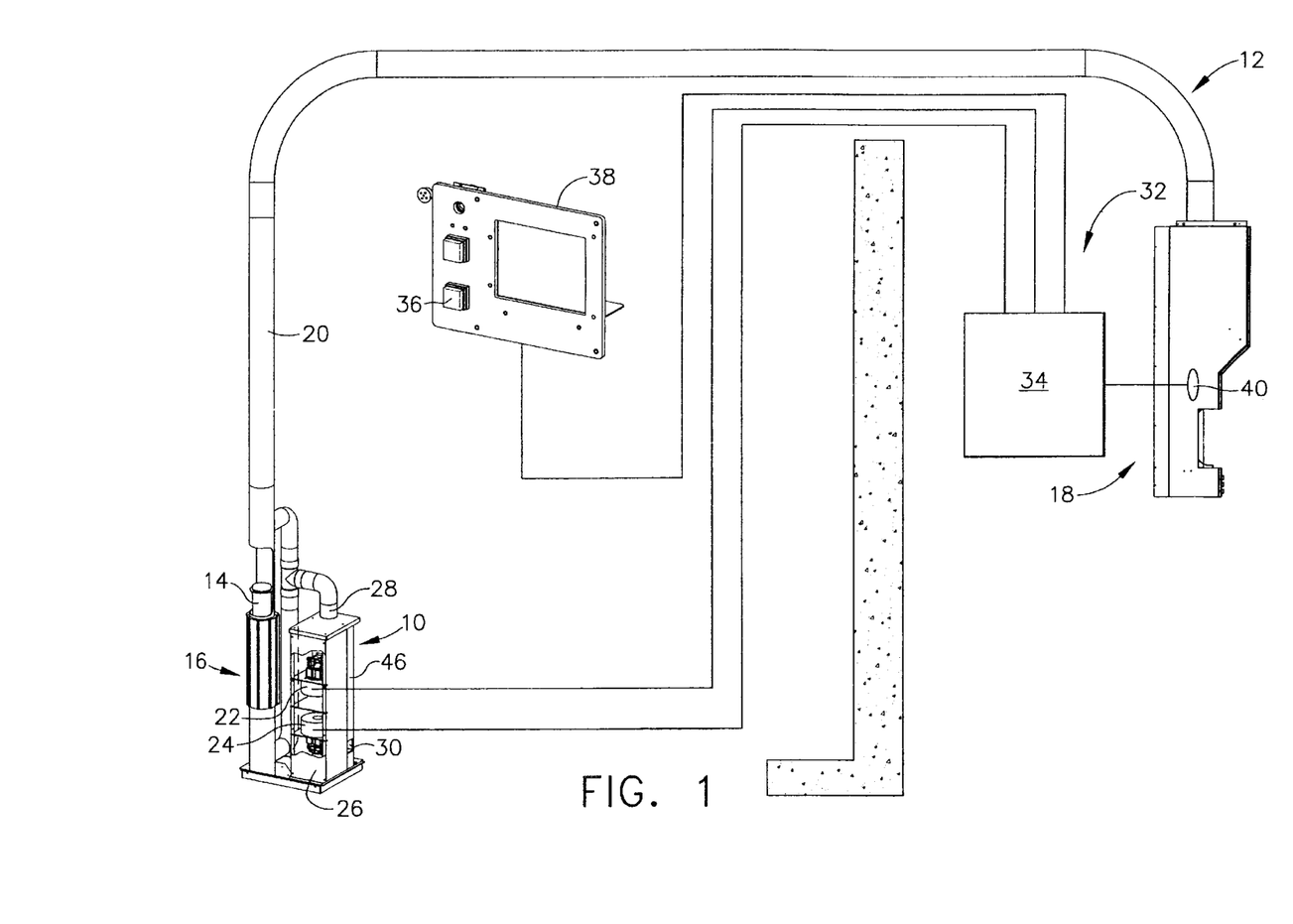
FIG. 1 is a perspective view of a pneumatic tube system having a main station and a remote station, the main station partially cut away to expose a blower assembly consistent with the present invention.

With reference to the Drawings, wherein like numbers refer to like components through the several views, FIG. 1 depicts a blower assembly 10 of a pneumatic tube system 12 that rapidly conveys and returns a capsule or carrier 14 between a main station 16 and a remote station 18.

A housing of the main station 16 is removed in FIG. 1 to expose the blower assembly 10 as well as the pneumatic connections to a pneumatic tube 20 that transports the carrier 14 between stations 16, 18. In addition, portions of the blower assembly 10 are exposed to show a first pneumatic source, depicted as an upper blower 22, and a second pneumatic source, depicted as a lower blower 24. It will be appreciated that an outer cabinet 26 of the blower assembly 10 provide an air-tight barrier with the exception of a system manifold 28 that communicates with the pneumatic tube 20 and an atmosphere port 30 that is open to the ambient environment.

It will be understood that the pneumatic connections to the pneumatic tube 20 provide for starting a carrier 14 upward when being sent and for slowing a carrier 14 when returned. In addition, the remote station 18 also includes an atmosphere port (not shown) for exhausting air when receiving a carrier 14 and for an intake of air when a carrier 14 is returned.

Components of a control system 32 of the pneumatic tube system 12 are depicted in diagram fashion. A controller 34 of the control system 32 receives a pressure command signal from a SEND button 36 on the main station 16 for initiating pressure to convey the carrier 14 to the remote station 18. The controller 34 also receives a vacuum command signal from a SEND button 40 on the remote station 18 for initiating vacuum to return the carrier 14 from the remote station 18. Based on the order in which the blowers 22, 24 are activated, the blower assembly 10 performs a selected one of the two modes through the action of a pneumatically switched air shifter 46, described in greater detail below. The controller 34 activates the upper and lower blowers 22, 24 for a preset duration sufficient for the to distance to be traversed by the carrier 14, although it will be appreciated that closed-loop feedback of carrier position may be used for some applications.

In the illustrative embodiment, the controller 34 includes a Siemens LOGO! Programmable Logic Module Model 24RC, which is installed in the remote station 18. Motor control signals close power relays (not shown) in the main station 16 to actuate the two blowers 22, 24. However, it will be appreciated that the controller 34 may be implemented with various analog or digital components capable of sequentially activating the two blowers 22, 24. In addition, although only two stations 16, 18 are shown, it will be appreciated that aspects of the invention have application to pneumatic tube systems 12 employing additional stations.

In addition, in the illustrative embodiment, each blower 22, 24 is a two-stage through-flow vacuum motor Model 115923 by AMETEK Lamb Electric of Kent, Ohio. The combined pneumatic power capacity of the two blowers 22, 24 is sufficient to propel a carrier 14. Consequently, the more costly alternatives are avoided.

Figure 2:
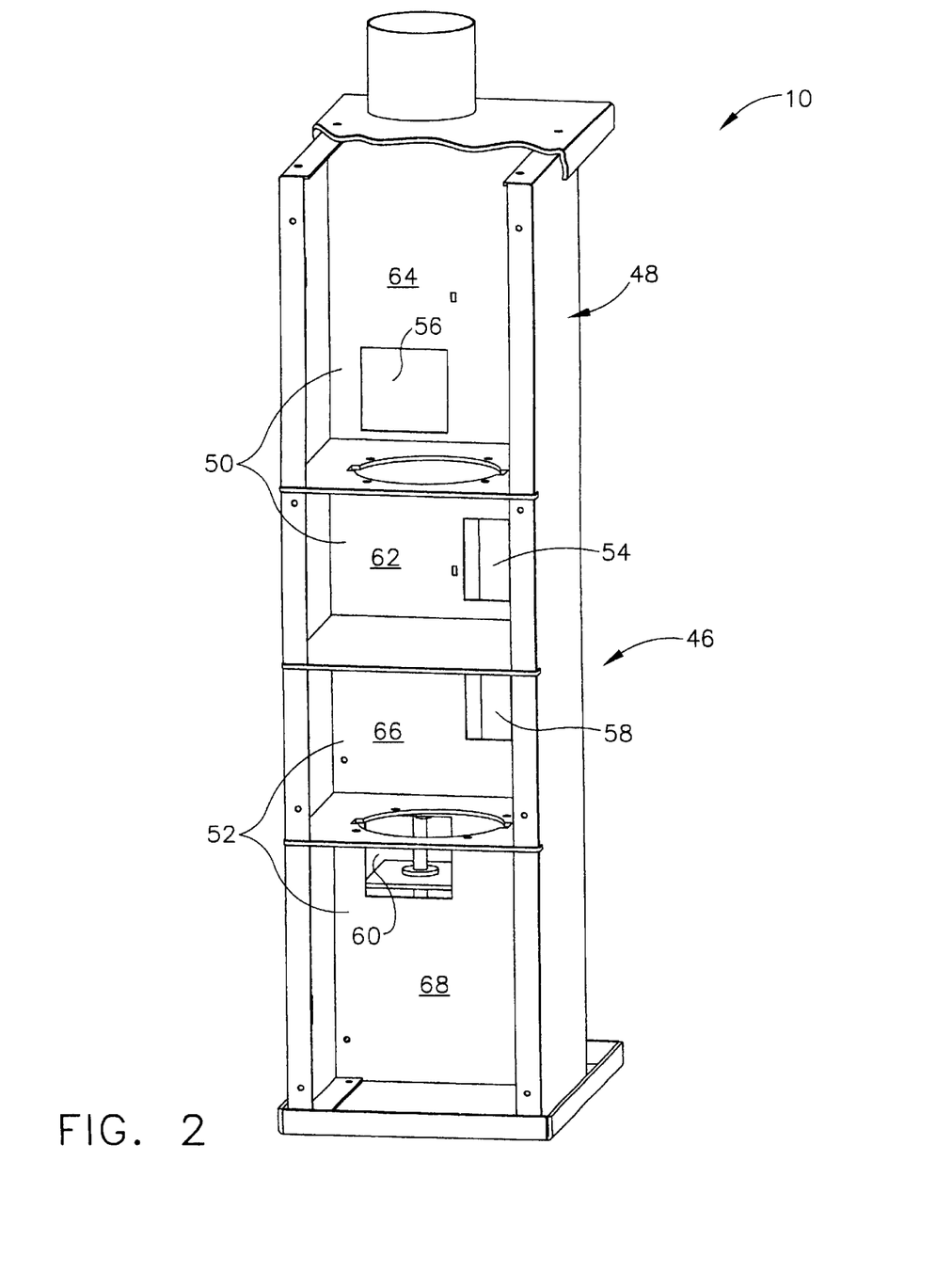
FIG. 2 is a perspective view of a blower side of a chassis of the blower assembly of FIG. 1 showing intakes and exhausts of two blower chambers.

FIG. 2 depicts a chassis 48 of the blower assembly 10 shown from a similar perspective as FIG. 1 with the upper and lower blowers 22, 24 removed to illustrate an upper blower chamber 50 and a lower blower chamber 52. These chambers 50, 52 are in pneumatic communication through four ports 54–60 with the air shifter 46 on an opposite side of the chassis 48. In particular, an upper intake blower port 54 communicates with an upper intake portion 62 of the upper blower chamber 50. An upper exhaust blower port 56 communicates with an upper exhaust portion 64 of the upper blower chamber 50. The upper blower 22 (not shown in FIG. 2) separates the upper intake and exhaust portions 62, 64 of the upper blower chamber 50 and draws air from the upper intake blower port 54 and expels air through the upper exhaust blower port 56. Similarly, a lower intake blower port 58 communicates with a lower intake portion 66 of the lower blower chamber 52. A lower exhaust blower port 60 communicates with a lower exhaust portion 68 of the lower blower chamber 52. The lower blower 24 (not shown in FIG. 2) separates the lower intake and exhaust portions 66, 68 of the lower blower chamber 52 and draws air from the lower intake blower port 58 and expels air through the lower exhaust blower port 60.

Figure 3:
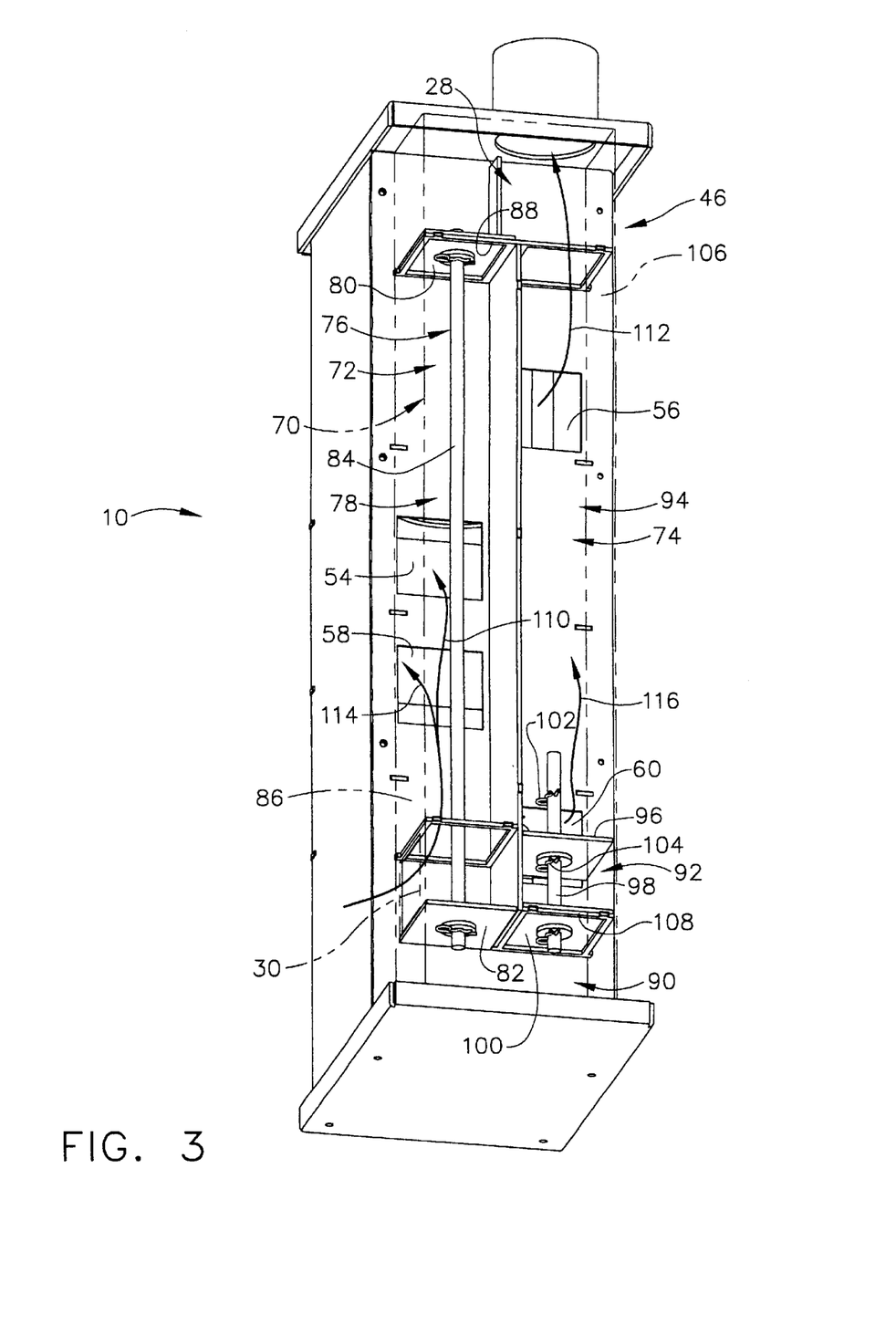
FIG. 3 is a perspective view of an air shifter side of the blower assembly of FIG. 2 exposed and to show air spools positioned for pressure mode.

FIG. 3 depicts a side of the blower assembly 10 approximately opposite to that shown in FIG. 2 to illustrate the air shifter 46 responding to the blowers 22, 24 (not shown in FIG. 3) to operate in either pressure or vacuum mode. An airtight panel 70 is transparently depicted to expose an intake passage 72 that communicates between the atmosphere port 30 and the system manifold 28. An exhaust passage 74 also communicates between the atmosphere port 30 and the system manifold 28, but otherwise is isolated along its length from the intake passage 72. The upper and lower intake blower ports 54, 58 communicate with the intake passage 72 and the upper and lower exhaust blower ports 56, 60 communicate with the exhaust passage 74.

An intake passage closure device, depicted as an intake spool 76, vertically translates within the intake passage 72 to form an intake chamber 78 that selectively closes the upper and lower intake blower ports 54, 58 to the system manifold 28 or to the atmosphere port 30. The intake spool 76 is comprised of an upper plate 80 connected to a lower plate 82 via a long connecting rod 84. The intake spool 76 shaped to vertically translate within the intake passage 72 with lower plate 82 forming a seal to walls 86 of the intake passage 72. In particular, without any pressure from the blowers 22, 24, the upper plate 80 of the intake spool 76 rests upon an intake passage valve seat 88, sealing the intake blower ports 54, 58 from the system manifold 28. In this lower position, the lower plate 82 is positioned below the atmosphere port 30, exposing the intake blower ports 54, 58 to the atmosphere port 30. In this lowered position, the lower plate 82 also closes the atmosphere port 30 to a lower manifold 90.

An exhaust passage closure device, depicted as an exhaust spool 92, forms an exhaust chamber 94 in the exhaust passage 74 that selectively closes the upper and lower exhaust ports 56, 60 to the system manifold 28 or to the atmosphere port 30. The exhaust spool 92 is comprises of an upper floating plate 96 that slides on a short connecting rod 98 that is connected to a lower fixed plate 100. The floating plate 96 is constrained to slide on the connecting rod 98 between an upper Cotter pin 102 and a lower Cotter pin 104. The exhaust spool 92 is shaped to vertically translate within the exhaust passage 74 with each plate 96, 100 sealing to walls 106 of the exhaust passage 74. In particular, without any pressure from the blowers 22, 24, the fixed plate 100 rests upon a lower exhaust valve seat 108, sealing the upper and lower exhaust blower ports 56, 60 from the lower manifold 90, and thus to the atmosphere port 30. Also, the floating plate 96 rests on the lower Cotter pin 104, positioned to expose all of the upper exhaust blower port 56 and most of the lower exhaust port 60 to the system manifold 28.

Air flow is depicted that illustrates how the above-described positions of the intake spool 76 and exhaust spool 92 are maintained by first activating the upper blower 22 (not shown in FIG. 3) and then activating the lower blower 24 (not shown in FIG. 3). Thereby, the blower assembly 10 performs in pressure mode, drawing in air from the atmosphere port 30 that is expelled through the system manifold 28. In particular, when the upper blower 22 is activated, air flows as depicted at arrow 110 between the atmosphere port 30 and the upper intake blower port 54. The air flows in the exhaust passage 74 as depicted at arrow 112 from the upper exhaust blower port 56 to the system manifold 28.

The air pressure in the system manifold 28 and exhaust chamber 94 above both spools 76 92 is allowed to increase for a period such a half of a second before activating the lower blower 24. Then the lower blower 24 is activated to cooperatively increase the pneumatic capacity of the blower assembly 10. The additional air flow is depicted at arrow 114 between the atmosphere port 30 and the lower intake blower port 58. The additional air flow in the exhaust passage 74 is depicted at arrow 116 from the lower exhaust blower port 60 to the system manifold 28. It will be appreciated that the half-second delay before activating the lower blower 24 is illustrative. The amount of delay may vary for different applications, accommodating factors such as the spool up time of a blower, inertia and friction of a given air shifter, and other considerations.

Figure 4:
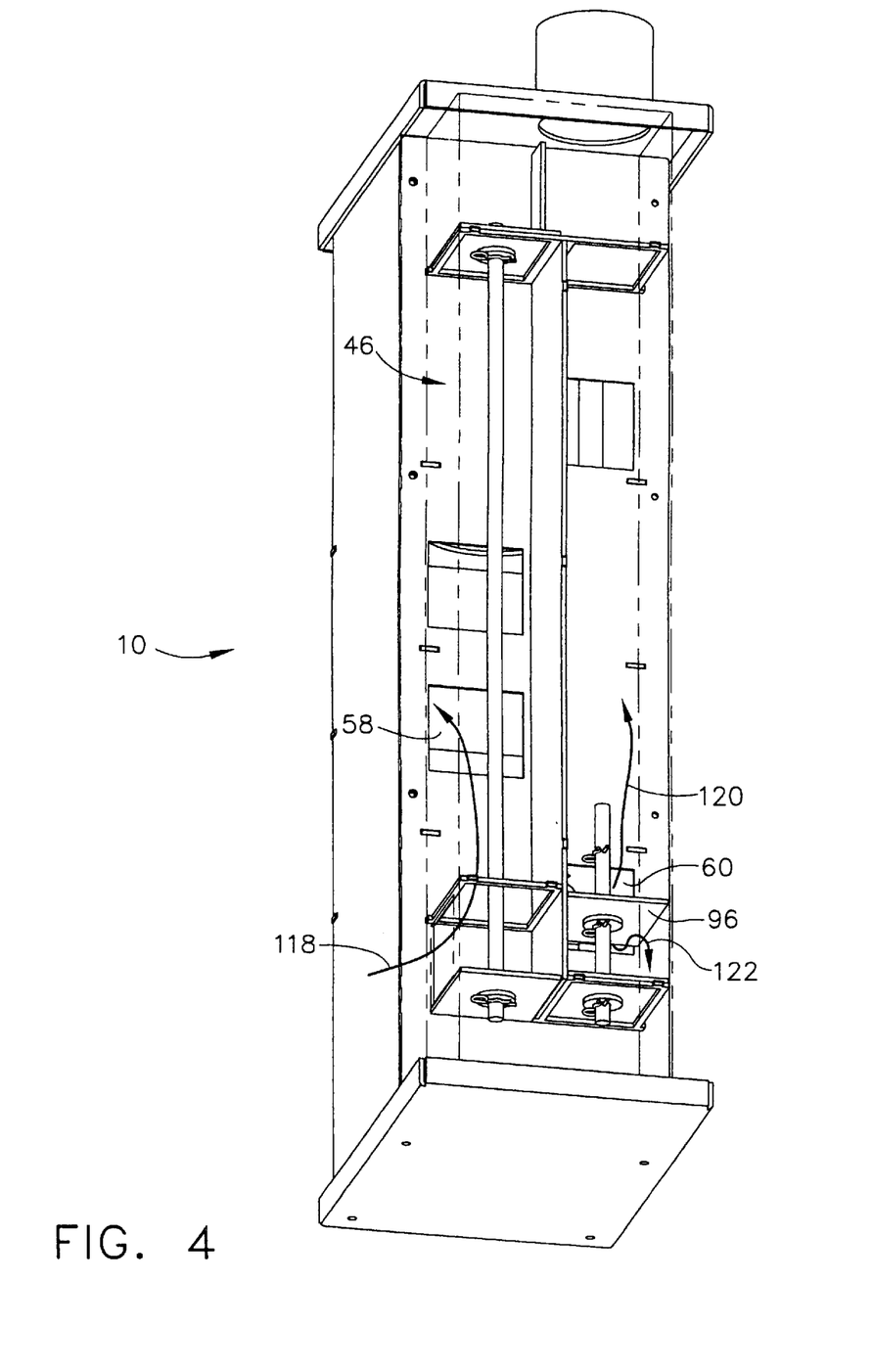
FIG. 4 is a perspective view of FIG. 3, annotated to show the initial conditions of switching to vacuum mode.

FIGS. 4–7 depict a sequence as the air shifter 46 switches to vacuum mode. FIG. 4 depicts the air shifter 46 of the blower assembly 10 beginning to switch to the vacuum mode.

Initially with both blowers 22, 24 (not shown in FIG. 4) inactive, both spools 76, 92 rest in their downward, pressure mode state. Vacuum mode begins with the lower blower 24 being activated. Air flow, as depicted at arrow 118, is drawn into the lower blower intake blower port 58 from the atmosphere port 30. The air flow, as depicted by arrows 120, 122, is then expelled from the lower exhaust blower port 60 on both the top and bottom respectively of the floating plate 96 of the exhaust spool 92.

Figure 5:
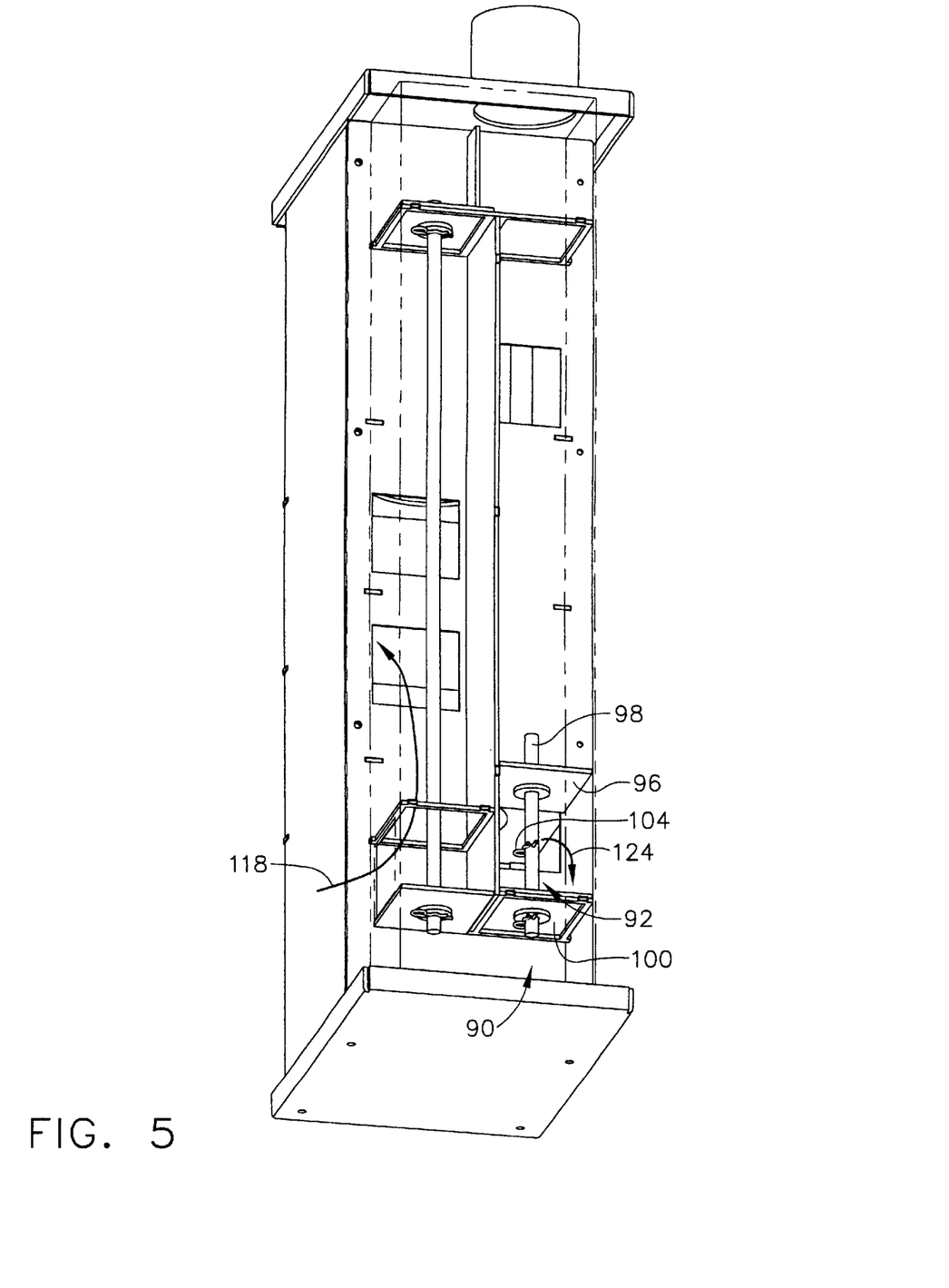
FIG. 5 is a perspective view of FIG. 4 with a floating plate of an exhaust spool moved by activation of the second blower to close the exhaust port of the second blower to the system manifold.

FIG. 5 depicts the floating plate 96 of the exhaust spool 92 shifting upward along the connecting rod 98 until contacting the upper Cotter pin 102 (not shown in FIG. 5) due to the air flow from the lower exhaust blower port 60, as depicted by arrow 124. The floating plate 96 develops sufficient momentum before contacting the upper Cotter pin 102 to raise the entire exhaust spool 92, thereby causing the fixed plate 100 to unseat from the exhaust passage valve seat 108. Air flow from the lower exhaust blower port 60 thus increases air pressure below both spools 76, 92 in the lower manifold 90.

Figure 6:
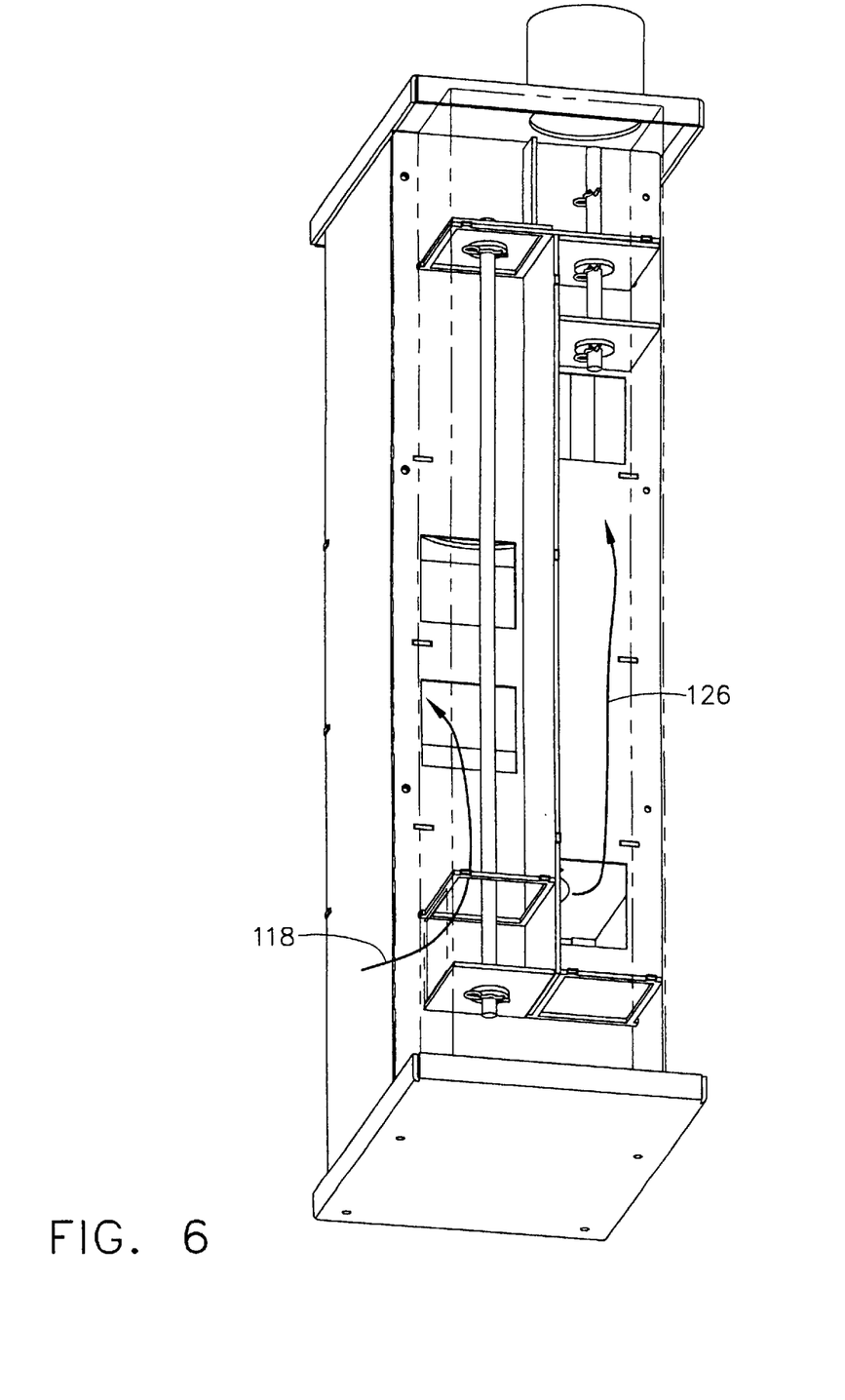
FIG. 6 is a perspective view of FIG. 5 with the exhaust spool fully translated to close the exhaust passage to the system manifold.

FIG. 6 depicts the exhaust spool 92 having been raised to its upper limit by the air flow from the lower exhaust blower port 60, as depicted by arrow 126. In particular, the exhaust spool 92 is lighter than the intake spool 76 due to the lighter weight of the short connecting rod 98 as compared to the long connecting rod 84. Thus, the exhaust spool 92 is switched to its upper limit first, causing both upper and lower exhaust blower ports 56, 60 to be closed to the system manifold 28.

Figure 7:
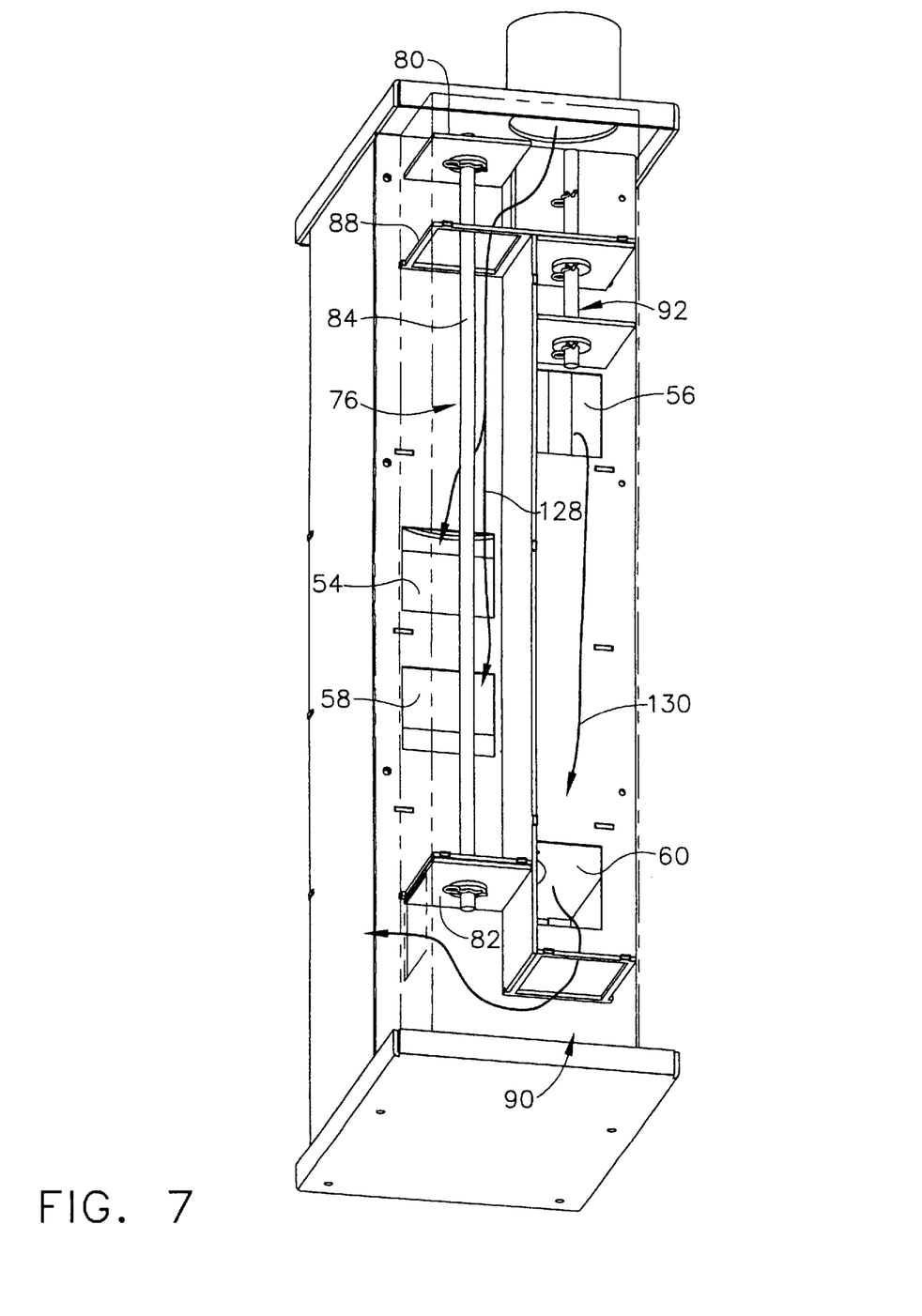
FIG. 7 is a perspective view of FIG. 6 with the intake spool switched by the second blower to both open the intake passage to the atmosphere port and to close the intake passage to the system manifold.

FIG. 7 depicts the intake spool 76 switched to its upper limit due to the air flow from the lower exhaust blower port 60. In particular, the increased air pressure in the lower manifold 90 against the lower plate 82 of the intake spool 76 causes the upper plate 80 to unseat from the intake passage valve seat 88. In this state, air flows, as depicted at arrow 128, from the system manifold 28 into the lower intake blower port 58. The expelled air flows, as depicted at arrow 130, from the lower exhaust blower port 60 the blower assembly 10 through atmosphere port 30. With the air shifter 46 switched to the pressure mode, the upper blower 22 is now activated to cooperatively increase the vacuum capacity of the blower assembly 10. Air flows into the upper intake blower port 54 from the system manifold 28, as depicted at arrow 132, and is expelled from the upper exhaust blower port 56 to the atmosphere port 30, as depicted at arrow 134.

Figure 8:
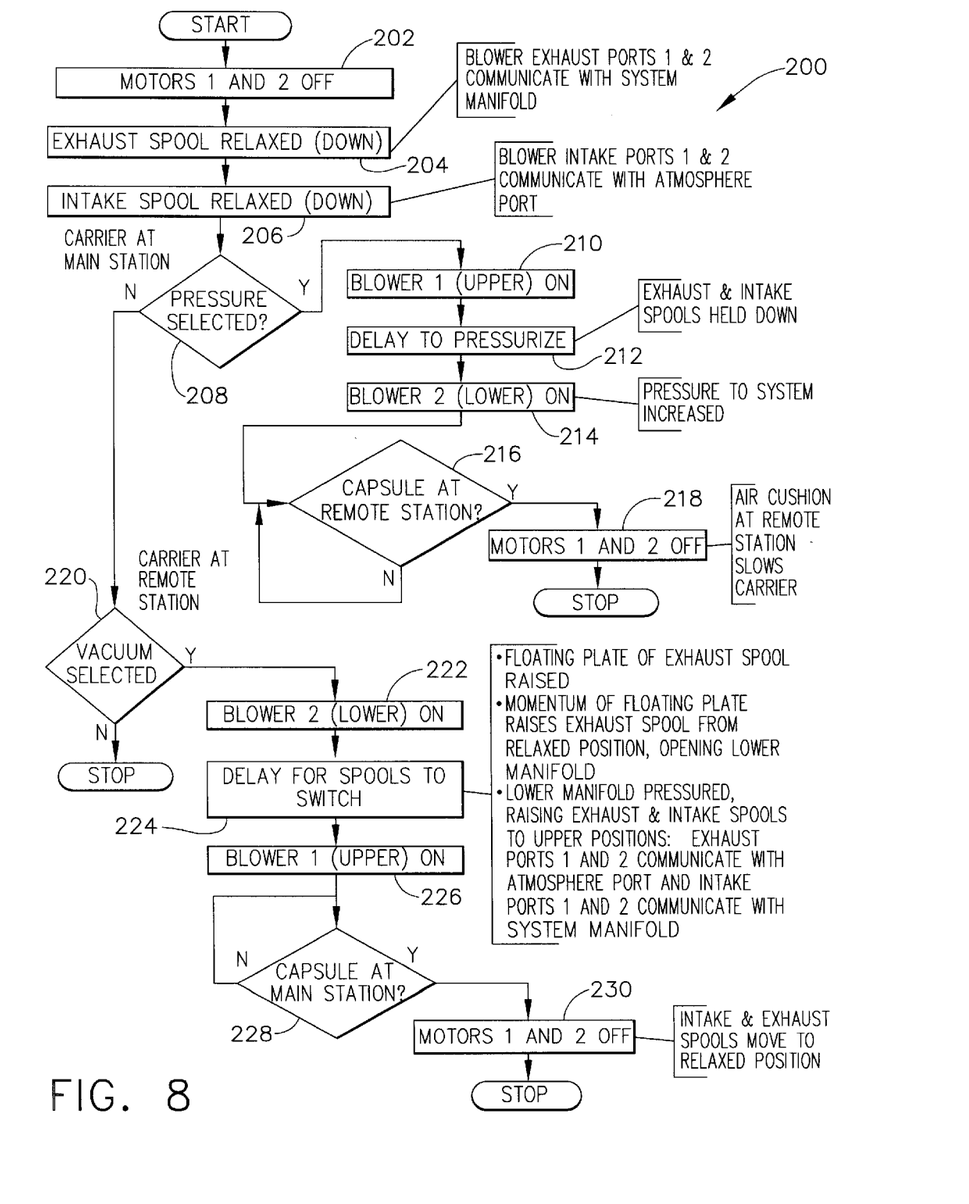
FIG. 8 is a flow diagram of operating the pneumatic tube system of FIG. 1 illustrating sequenced activation of the two blowers of the blower assembly to selectively provide pressure or vacuum.

With reference to FIG. 8, the operation of the blower assembly 10 is described in another way by a sequence of steps, or routine 200. Initially, both blower motors 1 (upper) and 2 (lower) are off (block 202). Air pressure is equalized within the blower assembly, allowing the exhaust spool to be relaxed in a down position, allowing blower exhaust ports 1 and 2 to communicate with the system manifold (block 204). In addition, the intake spool is relaxed in a down position, allowing the blower intake ports 1 and 2 to communicate with the atmosphere port (block 206).

With the blower system in its default, inactive state, a determination is made as to whether pressure mode has been selected (e.g., carrier is at the main station and is to be sent to the remote station) (block 208). If so, then the blower motor 1 (upper) is turned on (block 210). Thereafter, a delay state is used with blower 1 on, thereby increasing the air pressure above the intake and exhaust spools to hold them down in the pressure mode state (block 212). With the spools thus held, the blower motor 2 (lower) is turned on to increase pressure to the system (block 214). With both blowers on, a determination is made as to whether the capsule or carrier has reached the remote station (block 216). This determination may be made by referencing a timer to see if sufficient time has elapsed, by referencing a sensor triggered by the carrier, or by a manual operator input indicating successful transfer. If not at the remote station, then block 216 repeats. Else, blower motors 1 and 2 are turned off (block 218), wherein generally an air cushion at remote station slows the carrier.

If at block 208 pressure was not selected, then a determination is made as to whether vacuum has been selected (block 220), such as to return the carrier from the remote station to the main station. If selected, then the blower motor 2 (lower) is turned on (block 222). A delay is imposed in this state to allow for the spools to switch to the vacuum mode (block 224). In particular, the floating plate of the exhaust spool is raised with sufficient momentum to raise the exhaust spool off of its valve seat. The expelled air from blower motor 2 thereafter raises the exhaust spool to its fully raised (upper) position, allowing export ports of both blower motors to be in communication with the atmosphere port. The expelled air from the blower motor 2 (lower) also causes the intake spool to raise, causing the intake ports of both blower motors to be closed with respect to the atmosphere port and open with respect to the system manifold. With the blower assembly thus configured for vacuum mode, the blower motor 1 (upper) is turned on (block 226) to increase vacuum to the system. With both blowers on, a determination is made as to whether the capsule or carrier has returned to the main station (block 228). This determination may be made by referencing a timer to see if sufficient time has elapsed, by referencing a sensor triggered by the carrier, or by a manual operator input indicating successful transfer. If not at the main station, then block 228 repeats. Else, blower motors 1 and 2 are turned off (block 230), wherein generally an air cushion at the main station slows the carrier and the spools are allowed to relax to their default pressure mode state.

In use, an air shifter 46 is used to pneumatically switch a blower assembly 10 between pressure and vacuum modes for a pneumatic tube system 12 based upon the sequence in which two blower motors 22, 24 are activated. In particular, each blower motor positions spools 76, 92 in the air shifter 46 to the appropriate mode (pressure, vacuum) before the other blower is activated to increase pneumatic capacity. By virtue of the foregoing, a highly reliable passive air shifter 46 increases the operating speed and durability of the blower assembly 10 while allowing cost effective smaller blower motors to be used in cooperation to achieve the desired pneumatic capacity.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. For example, the illustrative embodiment described herein includes a specific arrangement of air passages 72, 74, an arrangement of ports 54–60 in these passages 72, 74, and two pneumatically positioned spools 76, 92 to selectively switch the communication of the ports 54–60. It will be appreciated that various arrangements of spools, ports, and passages may be arranged in order to accomplish a similar effect consistent with aspects of the present invention. For example, the blower assembly 10 may have a default position of vacuum mode wherein the spools are switched for pressure mode. As an additional example, selecting either mode causes the spools to switch.

It will further be appreciated that additional blower motors used in parallel or serially with the blower motors described herein may be employed to further increase the pneumatic capacity or to allow the use of smaller blower motors.

What is claimed is:

1. A pneumatic tube system comprising:
   a pneumatic carrier tube;
   a main station coupled to the pneumatic carrier tube configured to receive a carrier;
   a remote station coupled to the pneumatic carrier tube configured to receive the carrier; and
   a blower assembly coupled to the pneumatic carrier tube proximate to the main station and operable to provide pressure to convey the carrier from the main station to the remote station and to return the carrier; the blower assembly further comprising:
   a housing having a first blower,
   and a second blower, and
   an air shifter adjacent said housing and operably configured to pneumatically respond to the first blower being started before the second blower to provide pressure to the pneumatic carrier tube and to the second blower being started before the first blower to provide vacuum to the pneumatic carrier tube.

2. The pneumatic tube system of claim 1, wherein the blower assembly further comprises:
   a system manifold in communication with the pneumatic carrier tube;
   an atmosphere port;
   an intake passage communicating between the system manifold and the atmosphere port;
   an exhaust passage communicating between the system manifold and the atmosphere port;
   the first blower communicating between the intake passage via a first intake port and the exhaust passage via a first exhaust port;
   the second blower communicating between the intake passage via a second intake port and the exhaust passage via a second exhaust port
   an intake closure device placed to close the intake passage to a selected one of the atmosphere port and the system manifold in pneumatic response to activation respectively of the first and second blower; and
   an exhaust closure device placed to close the exhaust passage to a selected one of the system manifold and the atmosphere port in pneumatic response to activation respectively of the first and second blower.

3. The pneumatic tube system of claim 2, wherein the intake closure device comprises an intake spool slidably contained within the intake passage.

4. The pneumatic tube system of claim 3, wherein the exhaust closure device comprises an exhaust spool slidably contained within the exhaust passage.

5. The pneumatic tube system of claim 2, wherein the exhaust closure device comprises an exhaust spool slidably contained within the exhaust passage.

\* \* \* \* \*